Apr. 3, 1923.
L. FAUST
UNIVERSAL JOINT
Filed June 7, 1920
1,450,719
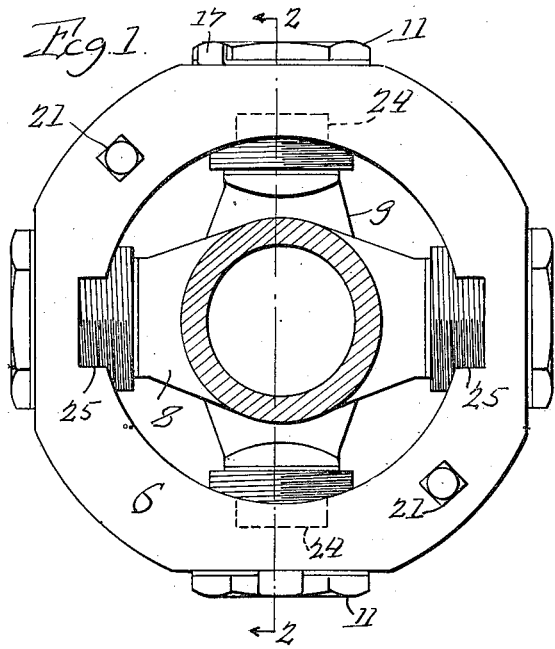
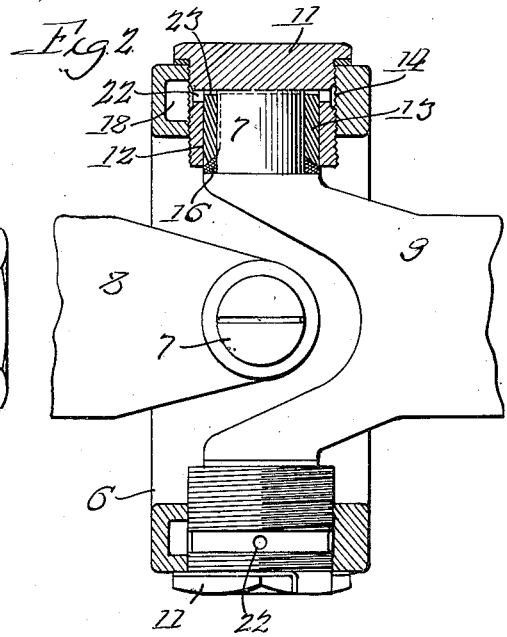
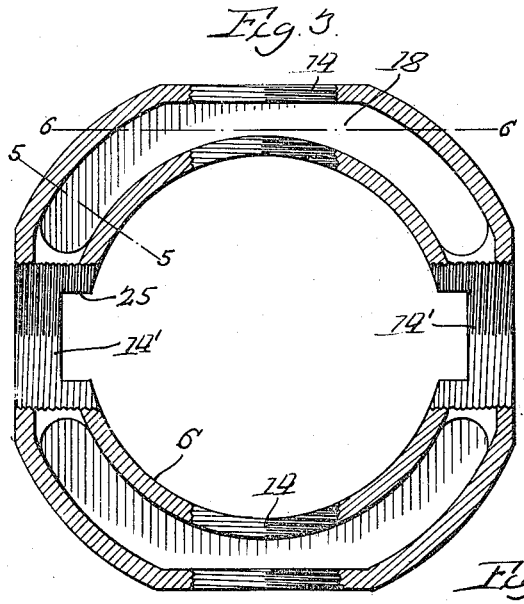
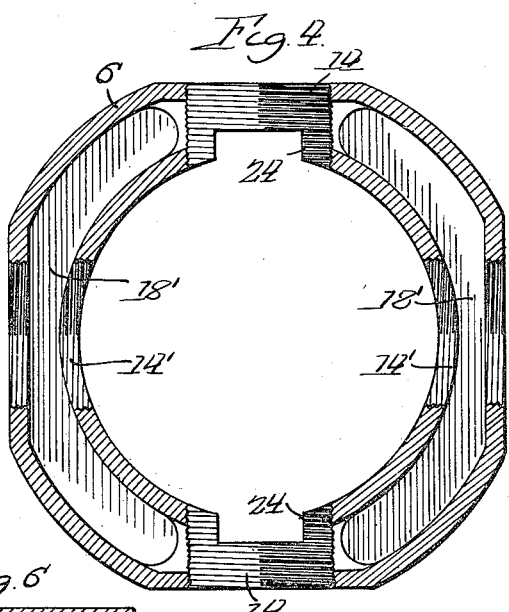
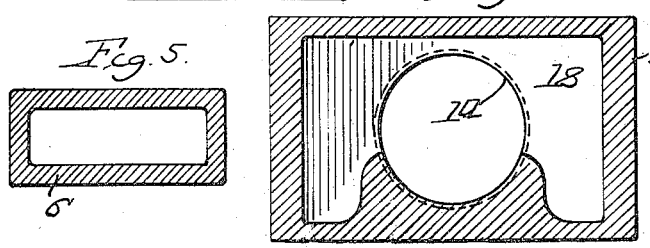
INVENTOR.
Levin Faust
BY Ira J. Wilson
ATTORNEY.

Patented Apr. 3, 1923.

1,450,719

UNITED STATES PATENT OFFICE.

LEVIN FAUST, OF ROCKFORD, ILLINOIS, ASSIGNOR OF ONE-FOURTH TO CARL E. SWENSON, ONE-FOURTH TO ERIC S. EKSTROM, AND ONE-FOURTH TO CARL L. ANDERSON, ALL OF ROCKFORD, ILLINOIS.

UNIVERSAL JOINT.

Application filed June 7, 1920. Serial No. 387,272.

*To all whom it may concern:*

Be it known that I, LEVIN FAUST, a citizen of the United States, residing at Rockford, in the county of Winnebago and State of Illinois, have invented certain new and useful Improvements in Universal Joints, of which the following is a specification.

My invention pertains to universal joints of that type characterized by a ring transmission structure to which the terminal coupling members are connected, and has more particular reference to joints of this character in which the coupling members are equipped with trunnions having bearing in the ring transmission structure.

Among the objects of my invention is to provide in a universal joint of the character described, a novel bearing unit for each trunnion removably mounted on the bearing ring and having provision for lubricating the trunnion bearing. In this regard, I have also aimed to so construct the bearing unit as to provide a very efficient radial and thrust bearing, the latter being had at the outer end of the trunnion and to effectually pack the bearing joint so that it will be oil-tight.

Another important object is to provide a ring type transmission member of novel construction which shall promote rigidity and strength and shall enable production at less cost than has heretofore been possible. More particularly, I have aimed to provide a one-piece ring transmission member and to embody therein a continuous-core lubricant reservoir which connects the bearing unit openings in the ring member. This reservoir is constructed in a novel manner so as to be of large capacity and not to depreciate the strength of the transmission member. To this end, the core is arranged in a novel manner to intersect only one side of each bearing unit opening, one pair of openings being intersected on the opposite side from the intersection of the other pair.

Other objects and attendant advantages will be appreciated by those familiar with this art as the invention becomes better understood by reference to the following description when considered in connection with the accompanying drawing, in which—

Figure 1 is a face view of a universal joint embodying my invention;

Fig. 2, a sectional view taken substantially on the line 2—2 of Fig. 1;

Figs. 3 and 4, sectional views through the center of the ring transmission member, Fig. 3 showing one-half section and Fig. 4 the other; and Figs. 5 and 6, detail sectional views through the ring member taken on the lines 5—5 and 6—6 respectively, of Fig. 3.

The novel features of design and construction in this invention are primarily for the purpose of promoting economy in manufacture and at the same time providing a joint which shall have ample strength, efficient radial and thrust bearings for the coupling members and a practical system of lubrication for such bearings. Heretofore, in ring type joints, the ring transmission member has been built up of a number of parts usually secured together by bolts. The objections following from such structures are entirely obviated in the present invention by the provision of a one-piece ring type transmission member, designated generally by character 6. This ring member carries quarteringly arranged radial bearing units providing bearings for the trunnions 7 of the terminal coupling members 8 and 9. The bearing units might be of any suitable construction, but I prefer to employ a combined cap and bushing structure embodying the principles disclosed in the Swenson application mentioned above. That is, each bearing unit shall comprise a cap member 11 exteriorly threaded and having a socket 12 in which is press-fitted a hardened steel bushing 13. When the opposed bearing units are tightened in their respective threaded openings 14 in the transmission member 6, the bottom walls 15 of the sockets 12 will be brought to bear against the outer ends of the trunnion 7 so as to provide thrust bearings therefor. The joint between the inner end of each bushing 13 and trunnion is packed by a suitable packing 16. By reason of the foregoing construction, the cap 11 may be accurately machined and does not require hardening, consequently there will be no distortion of its threads; and the bushing 12 may be hardened, ground internally and externally to a high degree of accuracy, and pressed into the socket 12, thereby providing a very efficient radial bearing. Any suitable lock nut device 17 may be employed for holding the cap 11 in position.

I have now aimed to provide a lubricant reservoir of novel construction, which shall provide lubricant for all of the trunnion bearings. In order to obtain a large capacity reservoir, I have cored the transmission member in a novel and effectual manner without depreciating the strength of such member and yet allowing unobstructed passage of the lubricant to the bearing units. To this end, I have provided a one-piece core, so shaped as to intersect each pair of bearing openings 14 only on one side thereof. It will be observed viewing Figs. 3 and 6, that the cored portion 18 intersects one entire side of the openings 14, that is substantially 180 degrees about such openings, and that on the other half section of the ring member the cored portion 18' intersects the opposite half section of the opening 14'. Thus a continuous annular lubricant reservoir of large capacity is provided, which intersects only one side of each bearing unit opening and which intersections are so arranged that each pair of openings is intersected on the side opposite from the other. The reservoir may be filled with lubricant of the proper consistency through suitable openings, such as 21, which are normally closed by plugs. Through means of suitable openings 22 through the threaded walls of the caps 11 and the space 23 at the outer ends of the bushings 13 the lubricant passes to the trunnion bearings, which are provided with suitable oil grooves.

In order to enable assembling, the ring member is cut away on opposite sides as indicated by characters 24 and 25, to permit insertion of the trunnion members into the openings 14 and 14'. It will thus be seen that after inserting a trunnion member in position, its bearing units will be screwed into position on the ring member thereby completing the assembly.

It is believed that the foregoing conveys a clear understanding of the principles and objects of this invention; and while I have illustrated but a single working embodiment of my improvements, it should be understood that the same are susceptible of considerable change and modification without departing from the spirit and scope of the invention as expressed in the appended claims, in which—

I claim:

1. In a universal joint of the character described, a one-piece transmission ring having quarteringly disposed radial bearing unit openings and shaped to provide an annular lubricant reservoir connecting said openings only on alternate sides thereof.

2. In a universal joint of the character described, a one-piece transmission ring having quarteringly disposed bearing unit openings and shaped to provide an annular lubricant reservoir intersecting each pair of openings, the intersection of one pair being on the opposite side of said ring from the intersection of the other pair.

3. In a universal joint, the combination of a ring transmission structure having a lubricant reservoir, terminal coupling members each having opposed trunnions, and a bearing unit for connecting each trunnion with the transmission structure comprising an externally threaded member, a hardened bushing having a press-fit in said member, said threaded member being threadingly engaged in the transmission structure so that each trunnion has a radial and a thrust bearing in its respective bearing unit, and means providing communication between the reservoir and said radial and thrust bearings.

4. A universal joint comprising a pair of coupling members having trunnion ends, a transmission member having an annular lubricant reservoir and quarteringly disposed openings intersecting said reservoir and threaded internally throughout their length, and bearing units threadingly engaged in said openings, each unit comprising a member externally threaded and having a bearing socket providing radial bearing for one of the trunnion ends, and a thrust bearing at the outer end of said radial bearing for the outer end of said trunnion.

5. In a trunnion type universal joint, the combination with terminal coupling members and a transmission member, of trunnions connecting said members, a thrust bearing for the outer end of each trunnion, a packing for the inner end of the radial bearing of each trunnion, and means providing for lubrication of said end thrust and radial bearings.

6. In a universal joint, a pair of coupling members each having diametrically opposed trunnion ends, a transmission ring having an annular lubricant reservoir, quarteringly disposed radial openings through the transmission ring intersecting the lubricant reservoir, and a bearing unit radially insertable in each opening and secured to the ring providing a radial and end thrust bearing, which have communication with the lubricant reservoir.

LEVIN FAUST.